United States Patent [19]

Otsuka et al.

[11] 4,382,071

[45] May 3, 1983

[54] PROCESS OF PREPARING SILICON TETRAFLUORIDE BY USING HYDROGEN FLUORIDE GAS

[75] Inventors: Toyozo Otsuka, Kamifukuoka; Naomichi Kitsugi, Tokorozawa; Teruo Fujinaga, Kawagoe, all of Japan

[73] Assignee: Central Glass Company, Limited, Ube, Japan

[21] Appl. No.: 279,614

[22] Filed: Jul. 1, 1981

[30] Foreign Application Priority Data

Jul. 2, 1980 [JP] Japan .................................. 55-89104
Feb. 16, 1981 [JP] Japan .................................. 56-20113

[51] Int. Cl.³ .............................................. C01B 33/08
[52] U.S. Cl. ................................................. 423/341
[58] Field of Search .................................. 423/341, 342

[56] References Cited

U.S. PATENT DOCUMENTS

| | | | |
|---|---|---|---|
| 2,833,628 | 5/1958 | Molstad | 23/205 |
| 2,861,872 | 11/1958 | Heller et al. | 23/205 |
| 3,645,678 | 2/1972 | Parish et al. | 423/341 |
| 3,674,431 | 7/1972 | Driscoll et al. | 23/205 |
| 4,206,189 | 6/1980 | Kosintsev et al. | 423/336 |

FOREIGN PATENT DOCUMENTS

1080662 2/1965 United Kingdom ............... 423/341

*Primary Examiner*—Jack Cooper
*Attorney, Agent, or Firm*—Fleit, Jacobson & Cohn

[57] ABSTRACT

A process of preparing silicon tetrafluoride by introducing hydrogen fluoride gas into a dispersion of powdery silicon oxide material, which needs not to be pure $SiO_2$, in sulfuric acid not lower than 65% in the concentration of $H_2SO_4$. The reaction takes place even at room temperature. By using amorphous silicon oxide material, the rate of reaction can be enhanced with better yield. Preferably, the concentration of $H_2SO_4$ in the liquid phase of the reaction system is maintained above 80% to obtain $SiF_4$ containing little $(SiF_3)_2O$.

9 Claims, 5 Drawing Figures

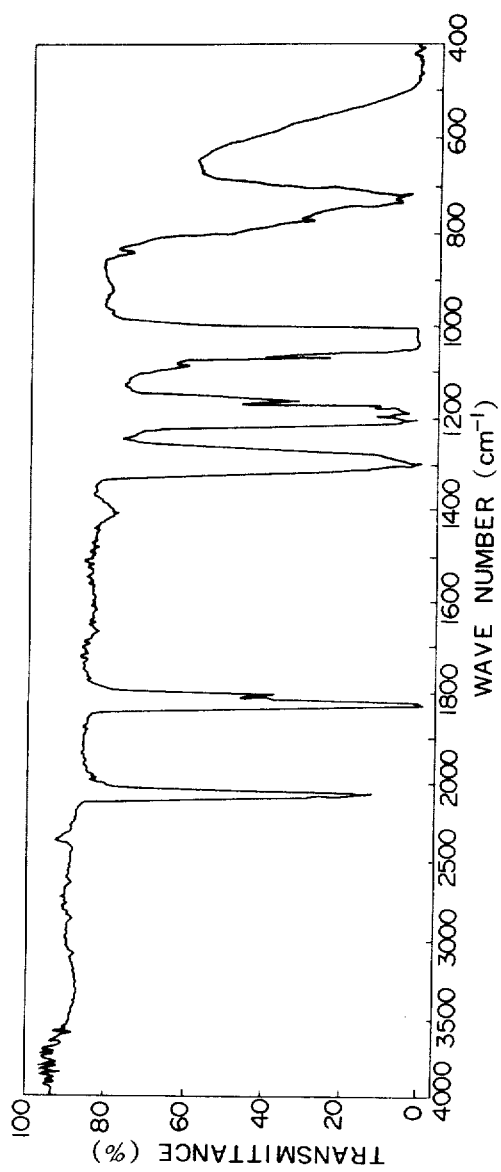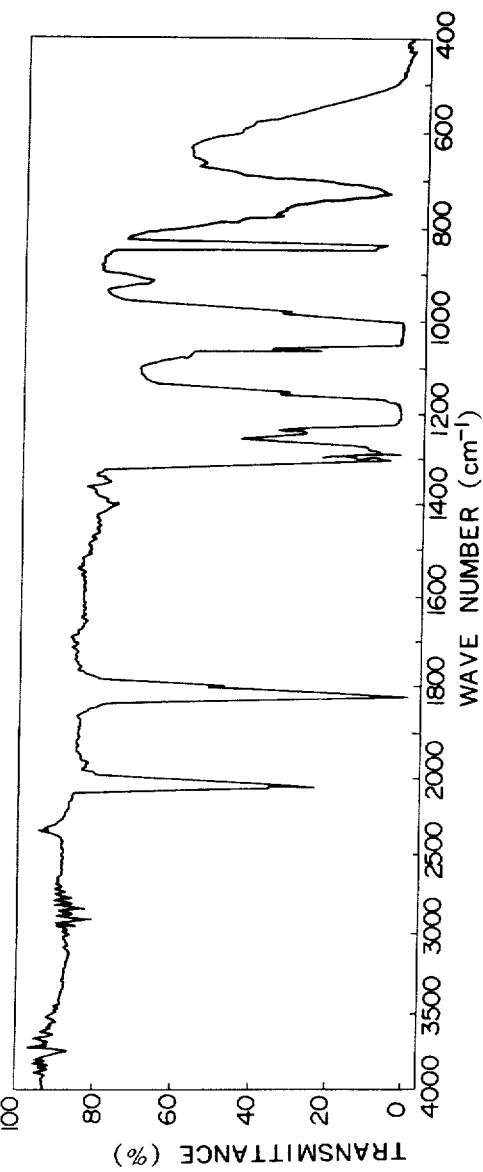

PROCESS OF PREPARING SILICON TETRAFLUORIDE BY USING HYDROGEN FLUORIDE GAS

BACKGROUND OF THE INVENTION

This invention relates to a process of preparing high purity silicon tetrafluoride useful for the preparation of amorphous silicon which is expected as an advantageous material for various electronic devices and particularly for photovoltaic cell elements.

From a purely scientific point of view, silicon tetrafluoride can be obtained by reaction between silicon oxide and hydrofluoric acid according to the following equation.

$$SiO_2 + 4HF \rightarrow SiF_4 + 2H_2O \qquad (1)$$

In the precense of water in liquid state, however, silicon tetrafluoride readily undergoes hydrolysis to form hexafluorosilicic acid and silicon oxide, which is in the form of hydrated gel-like silica, as represented by the following equation.

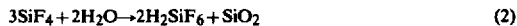

$$3SiF_4 + 2H_2O \rightarrow 2H_2SiF_6 + SiO_2 \qquad (2)$$

From an industrial viewpoint, the preparation of silicon tetrafluoride by the reaction of Equation (1) becomes intolerably inefficient if this reaction is accompanied by the hydrolysis reaction of Equation (2) because, besides a considerable lowering in the yield of silicon tetrafluoride, piping of the reaction apparatus is frequently and significantly choked with the hydrated silica formed by the hydrolysis. Therefore, it is necessary to suppress the hydrolysis reaction of Equation (2) either by preventing condensation of H$_2$O formed in the reaction of Equation (1) or by effectively separating H$_2$O from SiF$_4$ by causing the gaseous reaction product to come into contact with a suitable medium which is absorbent of water.

For example, U.S. Pat. No. 3,674,431 proposes to cause hydrogen fluoride gas to react with a pulverized crystalline silicon oxide such as quartz, cristobalite or tridymite by introducing water in a vapor-liquid mixed phase and hydrogen fluoride gas simultaneously into a packed column of the silicon oxide with heating to keep the temperature of the packed column at 80°-110° C. The reaction product of this method is a mixture of silicon tetrafluoride, hydrogen fluoride and water. However, this method is disadvantageous in the troublesomeness of introducing water in a vapor-liquid mixed phase simultaneously with hydrogen fluoride gas and also in the necessity of heating the packed column to a temperature in the range from 80° to 110° C. U.S. Pat. No. 2,861,872 proposes to suspend a powdered crystalline silicon oxide in a suitable organic medium such as glycerol or ethylene glycol and introduce hydrogen fluoride gas into the suspension with a view to preparing high purity silicon tetrafluoride, but this method is rather unsuited to industrial practice firstly because a considerably high reaction temperature such as 120°-177° C. becomes a requisite and secondly because a considerable loss of the organic medium by evaporation is inevitable. U.S. Pat. No. 2,833,628 teaches to prepare silicon tetrafluoride by dispersing silicon oxide in sulfuric acid and adding 20-28% hexafluorosilicic acid to the sulfuric acid slurry. In this process it is desirable that the concentration of sulfuric acid be above 65% because the amount of silicon tetrafluoride remaining dissolved in the sulfuric acid slurry sharply increases when the concentration of sulfuric acid becomes below 65%. This method too is rather unfavorable to industrial practice because of the need of using a large quantity of sulfuric acid to absorb a large amount of water contained in the relatively low concentration hexafluorosilicic acid and the consequential need of using a reaction vessel of an unfavorably large capacity.

SUMMARY OF THE INVENTION

It is an object of the present invention to provide a novel process of preparing silicon tetrafluoride, which process can achieve efficient conversion of silicon oxide into high purity silicon tetrafluoride under relatively mild reaction conditions without suffering from hydrolysis of the product into hydrated or gel-like silica.

In a process according to the invention, silicon tetrafluoride is formed by introducing hydrogen fluoride gas into a slurry which is obtained by dispersing a silicon oxide material in finely divided form in sulfuric acid such that the concentration of H$_2$SO$_4$ in the liquid phase of the reaction system never becomes lower than 65%.

The process according to the invention is represented by the above presented Equation (1). Hydrogen fluoride gas is employed as the fluorine source primarily with the view to avoiding introduction of unnecessary water into the reaction system. Besides, hydrogen fluoride gas can easily be introduced into the reaction system at a desired rate and readily dissolves in sulfuric acid used as a liquid dispersion medium to react with the dispersed silicon oxide. In the reaction system sulfuric acid efficiently absorbs water formed by the reaction of Equation (1), so that gaseous silicon tetrafluoride obtained by this process is practically free from water. At any timepoint during reaction the amount of moisture in the vapor phase of the reaction system is determined by a vapor pressure equilibrated to the concentration of sulfuric acid in the liquid phase at that timepoint, and this vapor pressure is far lower than a saturated vapor pressure at any point in the entire range of the reaction temperature. Accordingly, this process does not suffer from scaling or any other problem attributed to the formation of hydrated silica by the hydrolysis reaction of Equation (2).

Either crystalline silicon oxide or amorphous silicone oxide can be used in the presence of the invention, but the use of amorphous silicon oxide is recommended where priority is given to the ease of reaction and good yield.

To obtain silicon tetrafluoride scarcely containing hexafluorodisiloxane, it is preferable that the concentration of H$_2$SO$_4$ in the liquid phase of the reaction system does not become lower than 80% before completion of the process.

In this process the reaction of Equation (1) can be initiated under the atmospheric pressure even at room temperature, though the temperature will rise as the reaction proceeds, up to about 80° C. for instance.

The process of the invention may be performed either batchwise or continuously.

BRIEF DESCRIPTION OF THE DRAWINGS

FIG. 4(A) shows infrared absorption spectrum of silicon tetrafluoride gas obtained at an initial stage of a batchwise process according to the invention; and FIG. 4(B) shows infrared absorption spectrum of silicon tetrafluoride gas obtained at a last stage of the same process.

DESCRIPTION OF THE PREFERRED EMBODIMENTS

Figure 1:
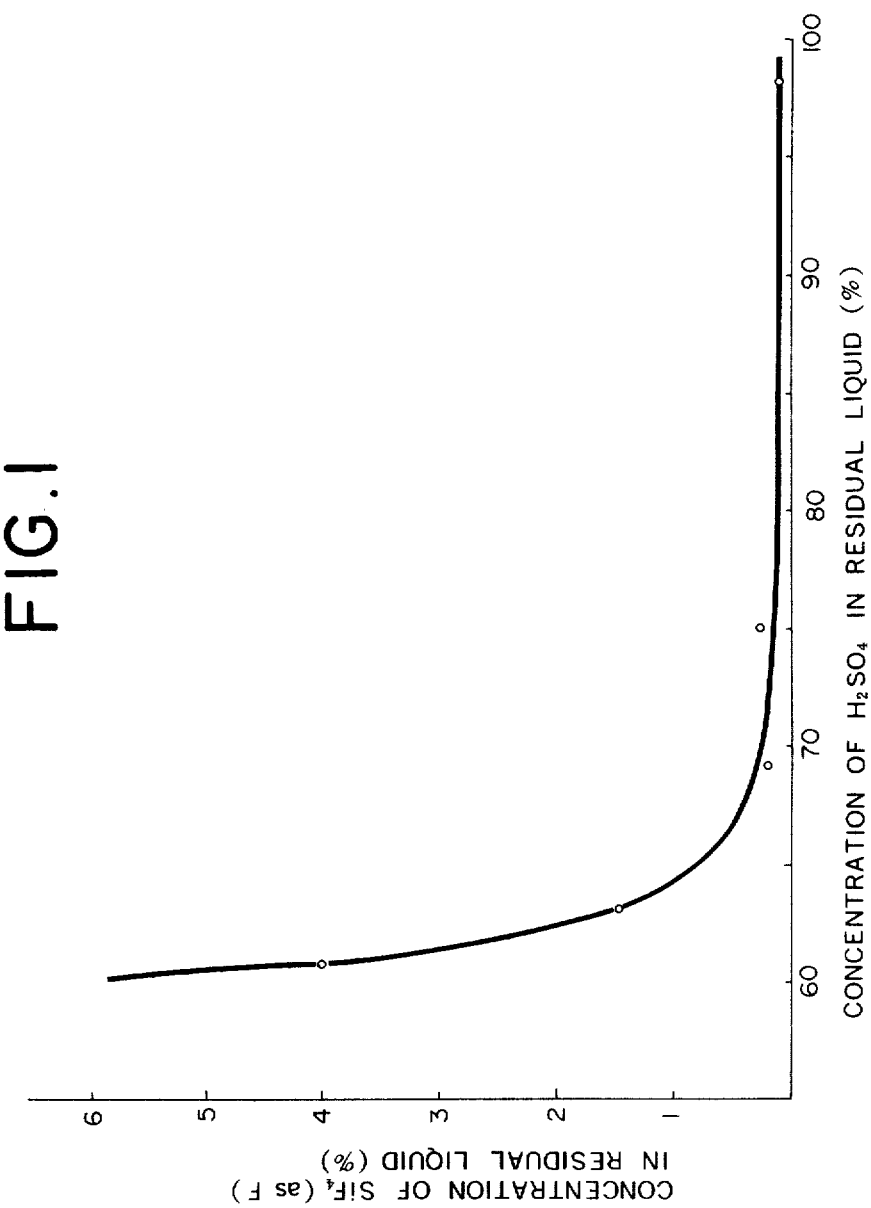
FIG. 1 is a graph showing the relation between the concentration of H$_2$SO$_4$ in a residual liquid after reaction between HF and SiO$_2$ and the concentration of SiF$_4$ (as F) dissolved in the same liquid.

In the present invention, sulfuric acid is employed as the liquid medium for reaction between hydrogen fluoride gas and solid particles of silicon oxide primarily because of strong dehydrating power of sulfuric acid and good solubility of hydrogen fluoride gas in this acid. As expected, $H_2O$ formed by the reaction of Equation (1) is wholly absorbed in the sulfuric acid as the liquid phase of the reaction system, so that the concentration of $H_2SO_4$ in the liquid phase gradually lowers as the reaction proceeds. The solubility of $SiF_4$ as the reaction product in the liquid phase of the reaction system is very low and practically negligible while the concentration of $H_2SO_4$ is sufficiently high but becomes significant when dilution of the liquid phase with the absorbed water proceeds beyond a certain limit. To confirm this tendency, we have carried out some experimental runs of a process according to the invention so as to vary the concentration of $H_2SO_4$ in the liquid phase after reaction between hydrogen fluoride and silicon oxide and examined the concentration of $SiF_4$ (as F, at a temperature of 40°–50° C.) remaining dissolved in the residual liquid in each run. The result is graphically presented in FIG. 1. As can be seen, the solubility of $SiF_4$ in the liquid phase sharply increases as the concentration of $H_2SO_4$ becomes lower than about 65%. Therefore, for efficient recovery of silicon tetrafluoride formed in a process of the invention it is necessary to maintain the concentration of $H_2SO_4$ in the liquid phase of the reaction system above 65% inclusive, and preferably above 75%, over the entire stage of the reaction between hydrogen fluoride and silicon oxide. Usually this requirement can easily be met by using a relatively strong sulfuric acid, such as 80–99% sulfuric acid, in the preparation of the initial slurry of silicon oxide particles.

Silicon oxide for use in the present invention needs not to be pure $SiO_2$. Use may be made of either silicon oxide of natural origin or silicon oxide obtained through a chemical process, and either crystalline silicon oxide or amorphous silicon oxide. Typical examples of crystalline silicon oxide materials of natural origin are siliceous sand, quartz and rock crystal. Some examples of amorphous silicon oxide materials of natural origin are activated clay, opal and diatomaceous earth (kieselguhr). Some examples of amorphous silicon oxide materials obtained through chemical processes are silica gel, powdery silica formed as a by-product in the preparation of a certain compound, such as the preparation of cryolite from sodium hexafluorosilicate, and glass cullet. Irrespective of the origin and structure, silicon oxide is used in finely pulverized form and uniformly dispersed in sulfuric acid so as to give a slurry. Considering the manner of dispersion of silicon oxide particles in the slurry and the efficiency of reaction with hydrogen fluoride introduced into the slurry, it is suitable to use 3 to 10 parts by weight of sulfuric acid per 1 part of silicon oxide.

From the viewpoint of performing a process according to the invention with utmost efficiency, it is preferable to use amorphous silicon oxide. That is, when amorphous silicon oxide is used the rate of the reaction of Equation (1) is considerably higher than in the case of using crystalline silicon oxide and, moreover, the reaction proceeds almost stoichiometrically. Of course it is necessary to use sufficiently fine particles of amorphous silicon oxide. Numerically, the particle size should be smaller than about 300 microns, and preferably smaller than about 150 microns. In the case of crystalline silicon oxide, the use of very fine particles often results in the formation of tiny bubbles on the surface of the slurry when hydrogen fluoride gas is blown into the slurry. The liquid film of these bubbles is strengthened by adsorption of the silicon oxide particles because of a relatively low rate of reaction between hydrogen fluoride and the crystalline silicon oxide, so that the bubbles continue to increase and constitute built-up bubbles which cannot easily be broken even by stirring and accordingly offer difficulties to the operation. In the case of using fine particles of amorphous silicon oxide bubbles do not form so easily or frequently, and even when some bubbles appear they break quickly without growing to built-up bubbles because the amorphous silicon oxide particles adsorbed on the liquid film of the bubbles are soon eliminated by rapid reaction with hydrogen fluoride dissolved in the sulfuric acid as the principal constituent of the liquid film.

When amorphous silicon oxide is used in the process of the invention, the reaction of Equation (1) takes place even at room temperature and proceeds almost stoichiometrically as the introduction of hydrogen fluoride gas into the silicon oxide-sulfuric acid slurry is continued, with a gradual rise of the temperature. As a consequence, it is possible to achieve almost theoretical conversion of the introduced hydrogen fluoride gas to silicon tetrafluoride. In other words, the gaseous reaction product scarecely contains unreacted hydrogen fluoride and therefore needs not to be subjected to a complicated refinining process.

Figure 2:
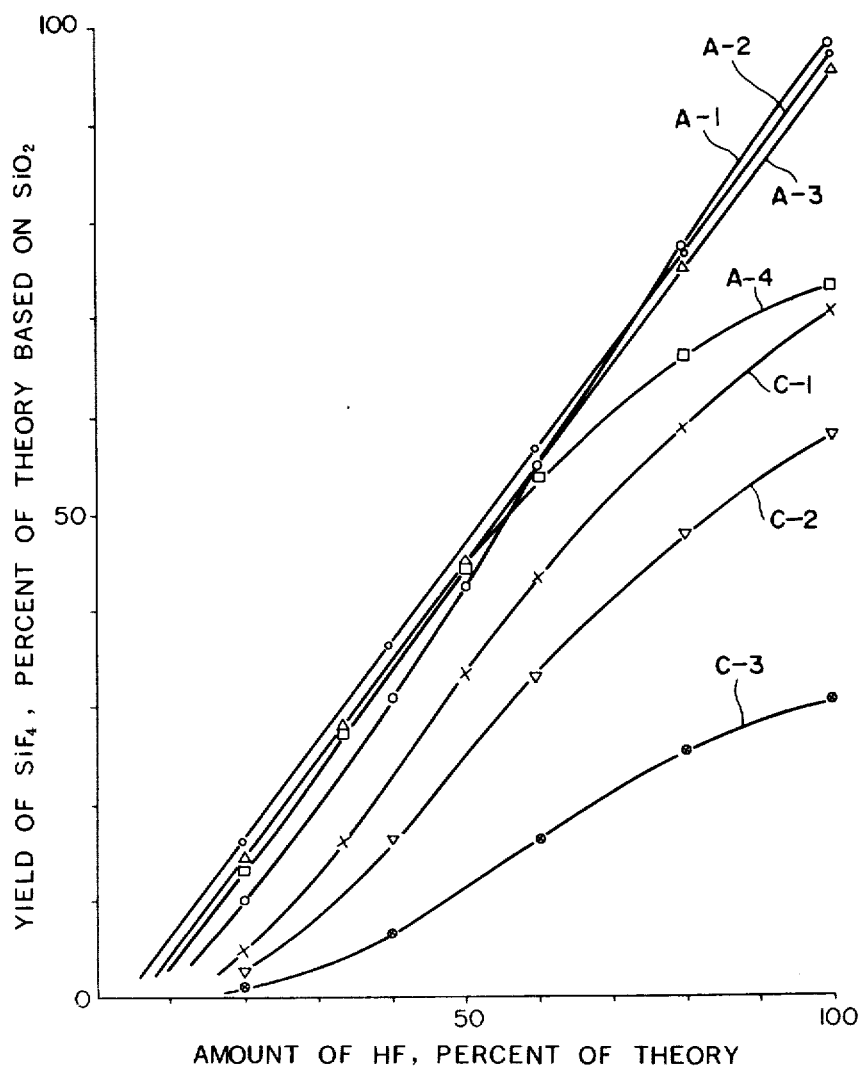
FIG. 2 is a graph showing variations in the rate of conversion of $SiO_2$ to $SiF_4$ in a process according to the invention depending on the type of $SiO_2$, concentration of $H_2SO_4$ and the temperature at the start of the reaction.

An experiment was carried out to examine the relationship between the amount of hydrogen fluoride gas brought into contact with silicon oxide and the yield of silicon tetrafluoride based on silicon oxide in a process according to the invention by alternately using siliceous sand as an example of crystalline silicon oxide and amorphous silicon oxide obtained in the synthesis of cryolite. The concentration of sulfuric acid used as the liquid medium for dispersion of silicon oxide particles and the temperature at the start of the reaction were also varied. In every run, the weight ratio of sulfuric acid to silicon oxide was 5:1. The results of this experiment are shown in FIG. 2, wherein the curves A-1 to A-4 and C-1 to C-3 represent the following runs, respectively. The graph of FIG. 2 can be taken as a good demonstration of the superiority of amorphous silicon oxide in reactivity with hydrogen fluoride to crystalline silicon oxide.

| Run | Silicon Oxide | Concentration of Sulfuric Acid | Initial Temperature |
|---|---|---|---|
| A-1 | amorphous | 99% | 20° C. |
| A-2 | amorphous | 90% | 20° C. |
| A-3 | amorphous | 80% | 20° C. |
| A-4 | amorphous | 70% | 20° C. |
| C-1 | crystalline | 80% | 80° C. |
| C-2 | crystalline | 75% | 60° C. |
| C-3 | crystalline | 85% | 100° C. |

In a process of the invention it is unnecessary to set strict limitations to the reaction temperature. It is possible to start the reaction of Equation (1) at room temperature, but if desired the silicon oxide-sulfuric acid slurry may be heated moderately, for example to about 50°–60° C. Since the reaction of Equation (1) is exothermic, the temperature of the slurry gradually rises as the reaction proceeds. If necessary, the reaction system may be cooled externally to avoid excessive rise of the reaction temperature. The reaction smoothly proceeds at the atmospheric pressure, but it is favorable to maintain a slightly pressurized state such as about 2–4 mmHg by gauge pressure in the reaction vessel to preclude any possibility of the pressure becoming below the atmospheric pressure. After completion of the reaction the remaining sulfuric acid will contain about 1–2% of fluorine matter. In the case of recycling the sulfuric acid, the fluorine matter can be recovered by evaporation at the stage of concentrating the residual sulfuric acid. Alternatively, the residual sulfuric acid may be used without recovery of fluorine matter in the preparation of wet process phosphoric acid for instance.

EXAMPLE 1

Use was made of an amorphous silicon oxide in the form of fine powder (90% $SiO_2$, dry basis) obtained as a by-product in the synthesis of cryolite through ammonia decomposition of sodium hexafluorosilicate. After sufficient drying, 50 g of this silicon oxide powder was uniformly dispersed in 280 g of 99% sulfuric acid, and the entire quantity of the thus prepared slurry was put into a reaction vessel made of Teflon. At room temperature (about 18° C.) hydrogen fluoride gas was introduced into the slurry in the reaction vessel at a constant rate of 16 g/hr. Soon the reaction between hydrogen fluoride and silicon oxide took place, and the temperature of the slurry rose gradually as hydrogen fluoride gas was continuously supplied until a maximal temperature of 55° C. was reached. During reaction, the pressure in the reaction vessel was above the atmospheric pressure by 2–4 mmHg.

A gaseous reaction product was passed through 99% concentrated sulfuric acid for the purpose of dehydration and then cooled to −130° C. to obtain powdery silicon tetrafluoride. By examining infrared absorption spectrum, the gaseous reaction product was confirmed to be $SiF_4$. The total quantity of hydrogen fluoride gas introduced into the reaction vessel was 60 g, and the recovered silicon tetrafluoride powder weighed 77.5 g. At the end of the reaction the concentration of $H_2SO_4$ in the residual liquid was 88.5%, and the concentration of F in the same liquid was 0.1%. By analysis, the impurity matter contained in the gaseous silicon tetrafluoride was as follows.

$SO_2$—20 ppm
$SO_4$—40 ppm
$PO_4$—0.3 ppm
B—0.3 ppm
As—0.1 ppm
Fe—0.5 ppm
Ni—0.1 ppm

EXAMPLE 2

Used as an amorphous silicon oxide material was activated clay (soluble $SiO_2$ 80%, total $SiO_2$ 89%), which was pulverized to fine particles that passed through a 60-mesh sieve (250 microns openings) and dried sufficiently. A slurry was prepared by uniformly dispersing 50 g of the clay powder in 280 g of 80% sulfuric acid, and the entire quantity of the slurry was put into a reaction vessel made of Teflon. While the temperature of the slurry was 20° C., hydrogen fluoride gas was introduced into the slurry at a constant rate of 16 g/hr. During the reaction between hydrogen fluoride and silicon oxide the pressure in the reaction vessel was 0–2 mmHg above the atmospheric pressure, and the temperature of the liquid phase of the reaction system rose gradually until a maximal temperature of 53° C. was reached.

A gaseous reaction product was recovered after washing with 99% sulfuric acid and confirmed to be $SiF_4$ by examining infrared absorption spectrum. The total quantity of hydrogen fluoride gas introduced into the reaction vessel was 56 g, whereas the quantity of the recovered silicon tetrafluoride was 71 g. At the end of the reaction of the concentration of $H_2SO_4$ in the residual liquid was 73.2%, and the concentration of F in the same liquid was 0.4%.

We have recognized that sometimes silicon tetrafluoride prepared by the above described process of the invention contains a very small amount of hexafluorodisiloxane as part of the impurity matter. In the case of using silicon tetrafluoride for the production of thin film of amorphous silicon by means of glow discharge for instance, the presence of hexafluorodisiloxane in silicon tetrafluoride results in the intrusion of siloxane bonds into the lattice of silicon atoms and, therefore, is significantly detrimental to the photoelectric characteristics of the silicon film.

Presumably, hexafluorodisiloxane is formed in the process of the invention through a consecutive reaction represented by the following equations.

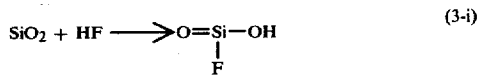

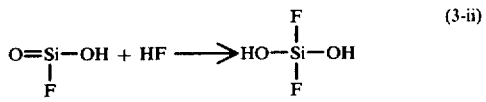

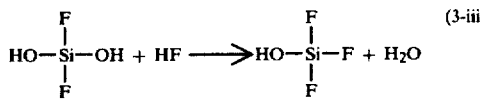

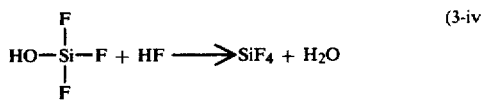

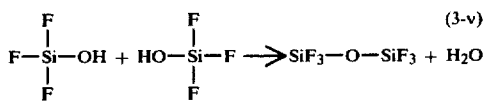

Besides, a decomposition reaction of the following equation is also conceivable.

invention if the concentration of $H_2SO_4$ in the liquid phase of the reaction system becomes lower than 80% before completion of the reaction of Equation (1).

| Run Number | Conc. of $H_2SO_4$ | Absorption Peak at 2057 cm$^{-1}$ ($SiF_4$) | | Absorption Peak at 839 cm$^{-1}$ (($SiF_3)_2O$) | | Peak Ratio log $(1-T_1/T_0)_{839}$ /log $(1-T_1/T_0)_{2057}$ |
|---|---|---|---|---|---|---|
| | | $T_1/T_0$ | -log $(1-T_1/T_0)$ | $T_1/T_0$ | -log $(1-T_1/T_0)$ | |
| 1 | 98% | 0.828 | 0.764 | 0.225 | 0.111 | 0.145 |
| 2 | 90% | 0.870 | 0.892 | 0.245 | 0.123 | 0.138 |
| 3 | 85% | 0.872 | 0.893 | 0.241 | 0.120 | 0.134 |
| 4 | 80% | 0.899 | 0.996 | 0.423 | 0.239 | 0.240 |
| 5 | 75% | 0.802 | 0.703 | 0.586 | 0.383 | 0.545 |
| 6 | 70% | 0.797 | 0.693 | 0.919 | 1.092 | 1.576 |

Absorption peak ratio for $SiF_4$ gas before contact with sulfuric acid solution:
log $(1-T_1/T_0)_{839\ cm^{-1}}$/log$(1-T_1/T_0)_{2057\ cm^{-1}}$ = 0.101/0.848 = 0.119

$$2SiF_4 + H_2O \rightarrow SiF_3\text{-}O\text{-}SiF_3 + 2HF \quad (4)$$

Sulfuric acid used as the liquid medium is gradually diluted by absorption of $H_2O$ formed by the reactions of Equations (3-iii) and (3-iv). Besides, the reaction of Equation (3-v) will take place competitively with the reaction of Equation (3-iv). Furthermore, a small portion of $SiF_4$ formed in this process will possibly react with either $H_2O$ absorbed in the sulfuric acid or vapor phase $H_2O$ present in the reaction system in a quantity determined by the vapor pressure corresponding to the concentration of sulfuric acid in the liquid phase as represented by Equation (4).

Based on these suppositions we have carried out an experiment, wherein silicon tetrafluoride gas (containing a small amount of hexafluorodisiloxane) obtained by a process of the invention was brought into contact with sulfuric acid solutions of various concentrations to examine resultant changes in the content of hexafluorodisiloxane in the sample gas by infrared spectrophotometry. Infrared absorption spectrum of $SiF_4$ exhibits the maximum absorption at 1031 cm$^{-1}$ and strong absorption at 391, 1191, 1294, 1827 and 2057 cm$^{-1}$, whereas infrared absorption spectrum of $SiF_3$-O-$SiF_3$ exhibits strong absorption at 839 and 1205 cm$^{-1}$ and moderate absorption at 984, 1032, 1040, 1242 and 1268 cm$^{-1}$. Because of independence of the absorption peak of $SiF_4$ at 2057 cm$^{-1}$ (attributed to stretching of Si-F) and the absorption peak of $SiF_3$-O-$SiF_3$ at 839 cm$^{-1}$ (attributed to stretching of $SiF_3$) from each other, it is possible to estimate the content of $SiF_3$-O-$SiF_3$ in $SiF_4$ by making a comparison between the scales of absorption at these two have numbers. In this experiment the volume of each sulfuric acid solution used as the trap was 250 ml, and the silicon tetrafluoride gas was brought into contact with each solution at room temperature and at a constant flow rate.

Figure 3:
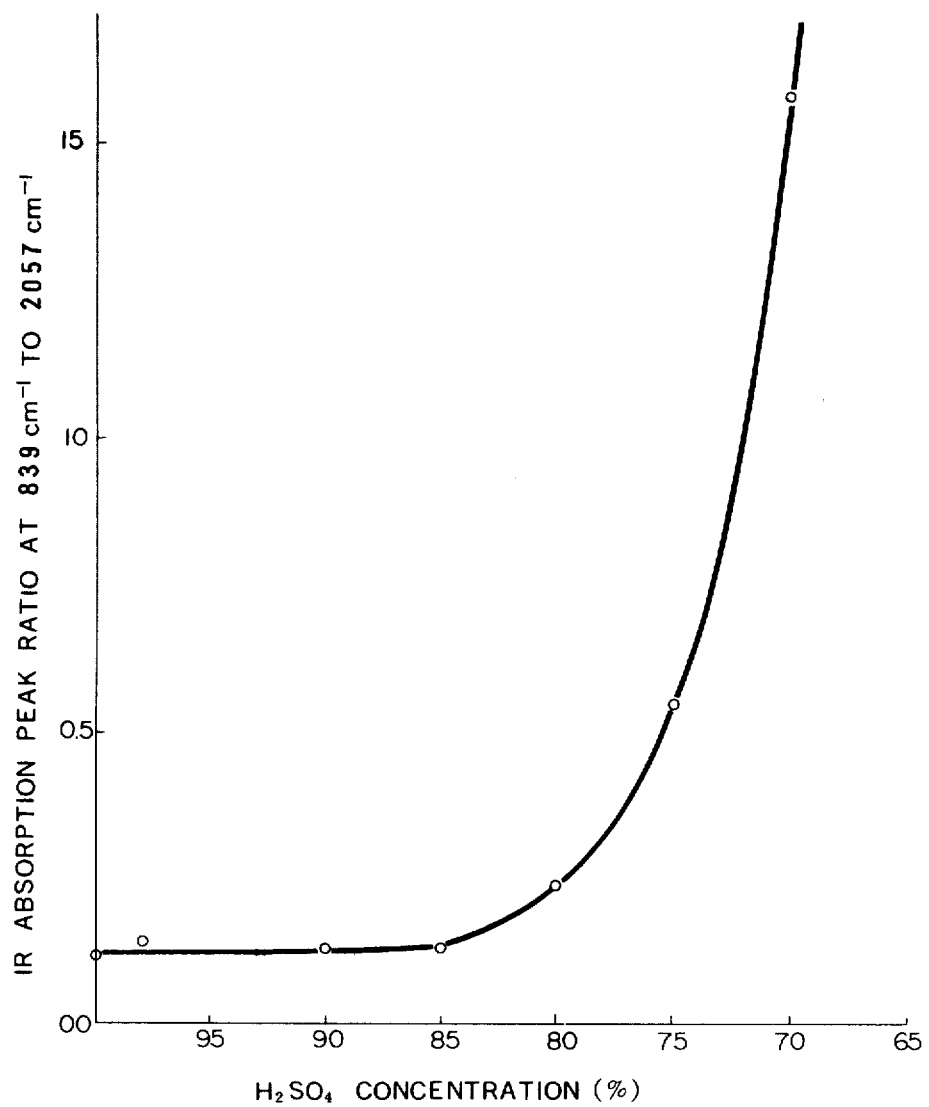
FIG. 3 is a graph showing the relationship between the concentration of a sulfuric acid solution with which silicon tetrafluoride gas was brought into contact and an infrared absorption peak ratio indicative of the content of hexafluorodisiloxane in the silicon tetrafluoride gas after contact with the acid solution.

The result of this experiment is presented in the following Table and also in FIG. 3. As can be seen, it was confirmed that the content of hexafluorodisiloxane in the silicon tetrafluoride gas after contact with a sulfuric acid solution significantly depends on the concentration of $H_2SO_4$ in the solution. More particularly, the contact of the silicon tetrafluoride gas with a sulfuric acid solution above 85% in the concentration of $H_2SO_4$ resulted in little increase in the content of hexafluorodisiloxane in the gas, but the contact of the same gas with a solution below 80% in the concentration of $H_2SO_4$ resulted in a great increase in the content of hexafluorodisiloxane, and the extent of the increase became progressively greater as the $H_2SO_4$ concentration was lowered. These facts suggest that a relatively large amount of hexafluorodisiloxane might be formed in a process of the The information given by the above described experiment was reconfirmed by the following experiments.

(A) A fine powder of high purity silicon oxide was dispersed in 95% sulfuric acid such that the mole ratio $SiO_2/H_2SO_4$ in the resultant slurry was 0.33, and hydrogen fluoride was continuously introduced into this slurry until the total quantity of HF reached a theoretical value according to Equation (1). After completion of the reaction caused by the introduction of hydrogen fluride, the concentration of $H_2SO_4$ in the residual liquid was measured to be 85%. By infrared spectrophotometry it was found that silicon tetrafluoride gas formed during the entire stage of the reaction scarcely contained hexafluorodisiloxane.

(B) The silicon oxide powder was dispersed in 95% sulfuric acid such that the mole ratio $SiO_2/H_2SO_4$ in the resultant slurry was 0.5, and hydrogen fluoride gas was continuously introduced into the slurry until the total quantity of HF reached a theoretical value according to Equation (1). At the end of the reaction the concentration of $H_2SO_4$ in the residual liquid was 80.3%. Silicon tetrafluoride gas formed by the reaction between $SiO_2$ and HF was entirely solidified and reserved in a trap cooled by liquid nitrogen. Subsequently the solid silicon tetrafluoride was gasified at room temperature and subjected to infrared spectrophotometry in a 100 mm long cell with NaCl window plate. The absorption spectrum exhibited a small peak unique to $SiF_3$-O-$SiF_3$.

(C) The silicon oxide powder was dispersed in 90% sulfuric acid such that the mole ratio $SiO_2/H_2SO_4$ in the resultant slurry was 0.7, and hydrogen fluoride was continuously introduced into the slurry until the total quantity of HF reached a theoretical value according to Equation (1). At the end of the reaction, the concentration of $H_2SO_4$ in the residual liquid was measured to be 73%. During proceeding of the reaction, several samples of silicon tetrafluoride gas were extracted at suitable intervals. By comparing infrared absorption spectra of these samples, it was confirmed that the content of hexafluorodisiloxane in the gaseous reaction product was almost nil during an initial stage of the reaction but gradually increased as the reaction proceeded. FIG. 4(A) is the infrared absorption spectrum of the gas sample extracted immediately after the commencement of the reaction, and FIG. 4(B) is the absorption spectrum of the gas sample at the last stage of the reaction. The spectrum of FIG. 4(B) exhibits a clear peak at 839 cm$^{-1}$ characteristic of $SiF_3$-O-$SiF_3$.

From these and other experimental results, it is certain that the presence of hexafluorodisiloxane in silicon tetrafluoride formed by a process according to the invention is mostly attributed to the reaction of Equation (4). Also, it is assured that the formation of hexafluorodisiloxane can almost completely be suppressed by maintaining the concentration of $H_2SO_4$ in the liquid phase of the reaction system above 80% inclusive, and preferably above 85%, over the entire stage of the reaction between silicon oxide and hydrogen fluoride.

Usually, lowering of the $H_2SO_4$ concentration beyond 80% before completion of the reaction can be avoided by using a relatively large amount of a sufficiently concentrated sulfuric acid such as 95% sulfuric acid to prepare a silicon oxide-sulfuric acid slurry. If necessary, a small quantity of very strong sulfuric acid such as 98-99% sulfuric acid or fuming sulfuric acid may be added to the liquid phase of the reaction system at a suitable stage of the reaction. Also it is possible to employ a continuous process wherein both hydrogen fluoride gas and a silicon oxide-sulfuric acid slurry are continuously introduced into a reaction vessel in a nearly stoichiometric proportion.

EXAMPLE 3

In a 5-liter reaction vessel of a closed type with polyethylene lining on the inside, a slurry was prepared by dispersing 189 g of finely pulverised siliceous sand (99% $SiO_2$) in 600 g of 95% sulfuric acid. Therefore, the mole ratio $SiO_2/H_2SO_4$ in this slurry was 0.534. Stirring the slurry at a rate of 20 rpm, the atmospheric air in the whole apparatus including the reaction vessel and piping was replaced by dry air (dehumidified in 98% sulfuric acid) which was continuously passed through the apparatus at a flow rate of 10 liter/min for a period of about 5 hr. After the termination of blowing of the dry air, hydrogen fluoride gas was blown into the reaction vessel at a constant rate of 40 g/hr.

The liquid temperature in the reaction vessel was 20° C. when blowing of hydrogen fluoride gas was commenced but gradually rose as the reaction between silicon oxide and hydrogen fluoride proceeded. The temperature reached 65° C. after the lapse of 1 hr and thereafter remained almost equilibrated at this temperature. The reaction (blowing of hydrogen fluoride gas into the reaction vessel) was continued for 6 hr, and a gaseous reaction product formed during this time period was collected and solidified in a pressure-proof trap cooled at −150° C. At the end of the reaction, the concentration of $H_2SO_4$ in the liquid in the reaction vessel was measured to be 81%.

Subsequently, the solidified reaction product was entirely gasified at room temperature to extract samples for infrared spectrophotometry. The cell was 100 mm long with NaCl window plate, and the instrument was a type EPI-G21 infrared spectrophotometer of HITACHI Ltd. In the infrared absorption spectrum of this gas, the ratio of the absorption peak at 839 $cm^{-1}$ characteristic of $(SiF_3)_2O$ to the absorption peak at 2057 $cm^{-1}$ characteristic of $SiF_4$ was calculated to be approximately 0.08, meaning that the tested gas was high purity $SiF_4$ gas extremely small in the content of hexafluorodisiloxane.

EXAMPLE 4

A slurry was prepared by dispersing 200 g of finely powdered rock crystal (99.8% $SiO_2$) in 1000 g of 95% sulfuric acid. The slurry was put into a closed type reaction vessel of which capacity was 8 liters, and the temperature of the slurry was maintained at 60° C. by external heating. Stirring the slurry, air in the whole apparatus including the reaction vessel was replaced by dry nitrogen gas. Then hydrogen fluoride gas was introduced into the reaction vessel at a constant rate of 60 g/hr to initiate the reaction between hydrogen fluoride and silicon oxide. The temperature of the liquid in the reaction vessel gradually rose as the reaction proceeded, but the temperature was maintained within the range from about 70° C. to about 80° C. by means of cooling jacket provided to the reaction vessel. The reaction was continued for 5 hr, and a gaseous reaction product formed during this time period was collected and solidified in a pressure-proof trap cooled by liquid nitrogen. At the end of the reaction, the concentration of $H_2SO_4$ in the liquid remaining in the reaction vessel was 85%.

Subsequently, the solidified reaction product was entirely gasified by slowly raising the temperature of the trap up to room temperature, and samples of this gas were subjected to infrared spectrophotometry. In the infrared absorption spectrum of this gas, the ratio of the absorption peak at 839 $cm^{-1}$ characteristic of $(SiF_3)_2O$ to the absorption peak at 2057 $cm^{-1}$ characteristic of $SiF_4$ was approximately 0.04. Thus, the reaction product of this example was confirmed to be high purity silicon tetrafluoride gas extremely small in the content of hexafluorodisiloxane.

What is claimed is:

1. A process of preparing silicon tetrafluoride, comprising the step of introducing hydrogen fluoride gas into a slurry obtained by dispersing a silicon oxide material in finely divided form in sulfuric acid wherein the principle component of said silicon oxide material is amorphous silicon oxide such that the concentration of $H_2SO_4$ in the liquid phase of the reaction system never becomes lower than 65% before completion of reaction between hydrogen fluoride and silicon oxide wherein the reaction is carried out at a temperature between room temperature and about 55° C.

2. A process according to claim 1, wherein said silicon oxide material is a natural mineral.

3. A process according to claim 2, wherein said silicon oxide material is selected from the group consisting of activated clay, opal and diatomaceous earth.

4. A process according to claim 1, wherein said silicon oxide material is a synthetic material.

5. A process according to claim 4, wherein said silicon oxide formed as a by-product in the preparation of cryolite from sodium hexafluorosilicate.

6. A process according to claim 1, wherein the weight ratio of $H_2SO_4$ to $SiO_2$ in said slurry before the introduction of hydrogen fluoride gas is in the range from 3:1 to 10:1.

7. A process according to claim 1, wherein the concentration of $H_2SO_4$ in the liquid phase of the reaction system is maintained above 80% until completion of the reaction.

8. A process according to claim 1, wherein the concentration of $H_2SO_4$ in the liquid phase of the reaction system is maintained above 85% until completion of the reaction.

9. A process according to claim 1, wherein the introduction of hydrogen fluoride gas into said slurry is commenced while said slurry is maintained at room temperature.

* * * * *